US012634255B2

(12) United States Patent
An

(10) Patent No.: US 12,634,255 B2
(45) Date of Patent: May 19, 2026

(54) SERVICE REQUEST PROCESSING METHOD, APPARATUS AND SYSTEM, DEVICE, AND STORAGE MEDIUM FOR CROSS-CLUSTER SERVICE ACCESS

(71) Applicant: JINGDONG TECHNOLOGY INFORMATION TECHNOLOGY CO., LTD., Beijing (CN)

(72) Inventor: Hongkui An, Beijing (CN)

(73) Assignee: JINGDONG TECHNOLOGY INFORMATION TECHNOLOGY CO., LTD., Beijing (CN)

( * ) Notice: Subject to any disclaimer, the term of this patent is extended or adjusted under 35 U.S.C. 154(b) by 93 days.

(21) Appl. No.: 18/937,326

(22) Filed: Nov. 5, 2024

(65) Prior Publication Data

US 2025/0211561 A1 Jun. 26, 2025

(30) Foreign Application Priority Data

Dec. 21, 2023 (CN) .......................... 202311773836.0

(51) Int. Cl.
*H04L 61/103* (2022.01)
*H04L 61/4511* (2022.01)
*H04L 67/10* (2022.01)

(52) U.S. Cl.
CPC ........ *H04L 61/103* (2013.01); *H04L 61/4511* (2022.05); *H04L 67/10* (2013.01)

(58) Field of Classification Search
CPC ..... H04L 61/103; H04L 61/4511; H04L 67/10
See application file for complete search history.

(56) References Cited

U.S. PATENT DOCUMENTS

| | | | | |
|---|---|---|---|---|
| 11,388,136 B2 * | 7/2022 | Singhal | ............... | H04L 61/5007 |
| 11,481,243 B1 * | 10/2022 | Wang | ....................... | G06F 9/547 |
| 12,034,567 B1 * | 7/2024 | Arora | ....................... | H04L 67/10 |
| 2021/0373971 A1 * | 12/2021 | Lu | ........................ | G06F 9/5077 |

FOREIGN PATENT DOCUMENTS

WO WO-2024234764 A1 * 11/2024 ......... H04L 41/0803

* cited by examiner

*Primary Examiner* — Hee Soo Kim
(74) *Attorney, Agent, or Firm* — K&L Gates LLP

(57) ABSTRACT

A service request processing method includes that: a target domain name resolution request corresponding to a target federated service to be accessed by a first deployment unit in a current working cluster is generated; the target domain name resolution request is sent to a federated domain name cluster, and the federated domain name cluster processes the target domain name resolution request to determine a target IP address; an IP address of a second deployment unit for implementing the target federated service in a target working cluster is determined based on the target IP address and based on the federated gateway address and the federated endpoint set that correspond to each federated service determined by the federated management cluster; and the target federated service request is sent to the second deployment unit based on the IP address of the second deployment unit

20 Claims, 6 Drawing Sheets

Generate a target domain name resolution request corresponding to a target federated service to be accessed by a first deployment unit in a current working cluster — S110

Send the target domain name resolution request to a federated domain name cluster, so that based on a federated gateway address and a federated endpoint set that correspond to each federated service determined by the federated management cluster, the federated domain name cluster processes the target domain name resolution request to determine and return a target internet protocol (IP) address corresponding to the target federated service — S120

Determine an IP address of a second deployment unit for implementing the target federated service in a target working cluster based on the target IP address and based on the federated gateway address and the federated endpoint set that correspond to each federated service determined by the federated management cluster — S130

Send the target federated service request to the second deployment unit based on the IP address of the second deployment unit so that the second deployment unit responds to the target federated service request — S140

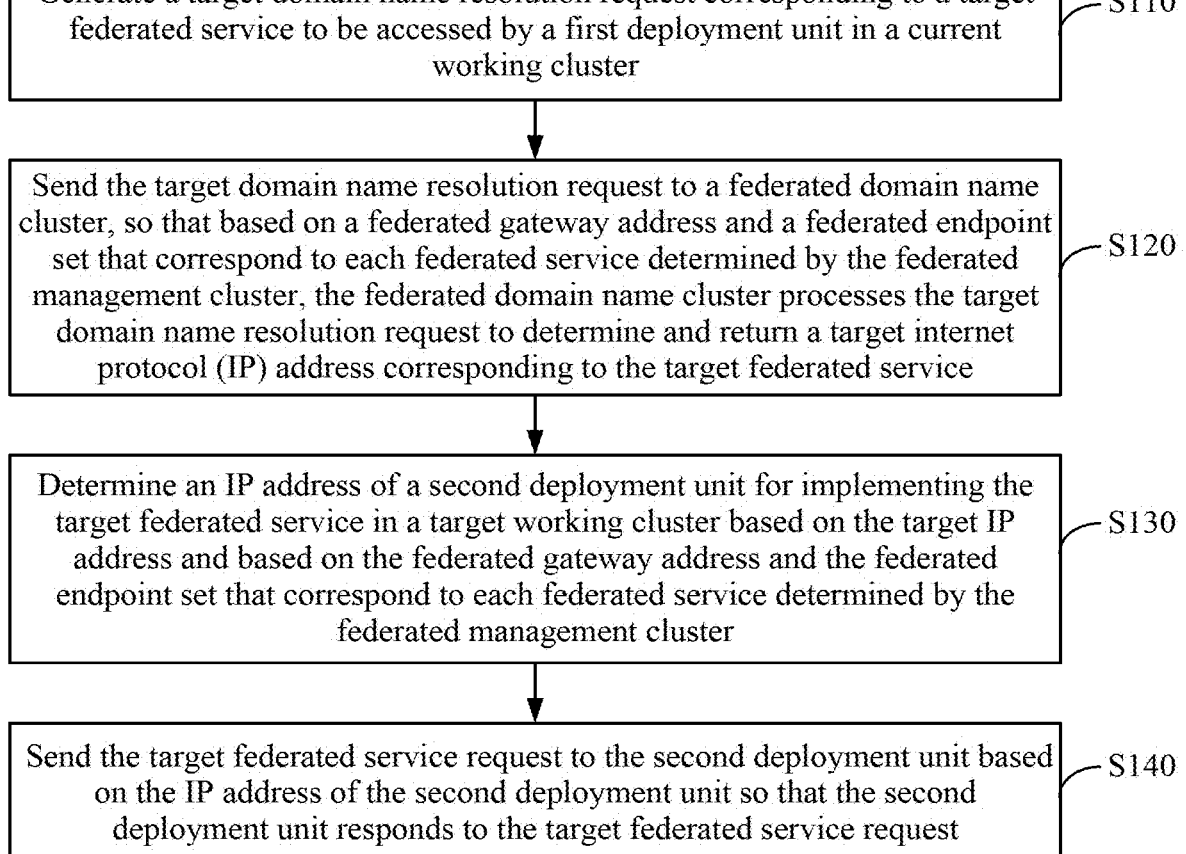

Generate a target domain name resolution request corresponding to a target federated service to be accessed by a first deployment unit in a current working cluster ⟋— S110

Send the target domain name resolution request to a federated domain name cluster, so that based on a federated gateway address and a federated endpoint set that correspond to each federated service determined by the federated management cluster, the federated domain name cluster processes the target domain name resolution request to determine and return a target internet protocol (IP) address corresponding to the target federated service ⟋— S120

Determine an IP address of a second deployment unit for implementing the target federated service in a target working cluster based on the target IP address and based on the federated gateway address and the federated endpoint set that correspond to each federated service determined by the federated management cluster ⟋— S130

Send the target federated service request to the second deployment unit based on the IP address of the second deployment unit so that the second deployment unit responds to the target federated service request ⟋— S140

FIG. 1

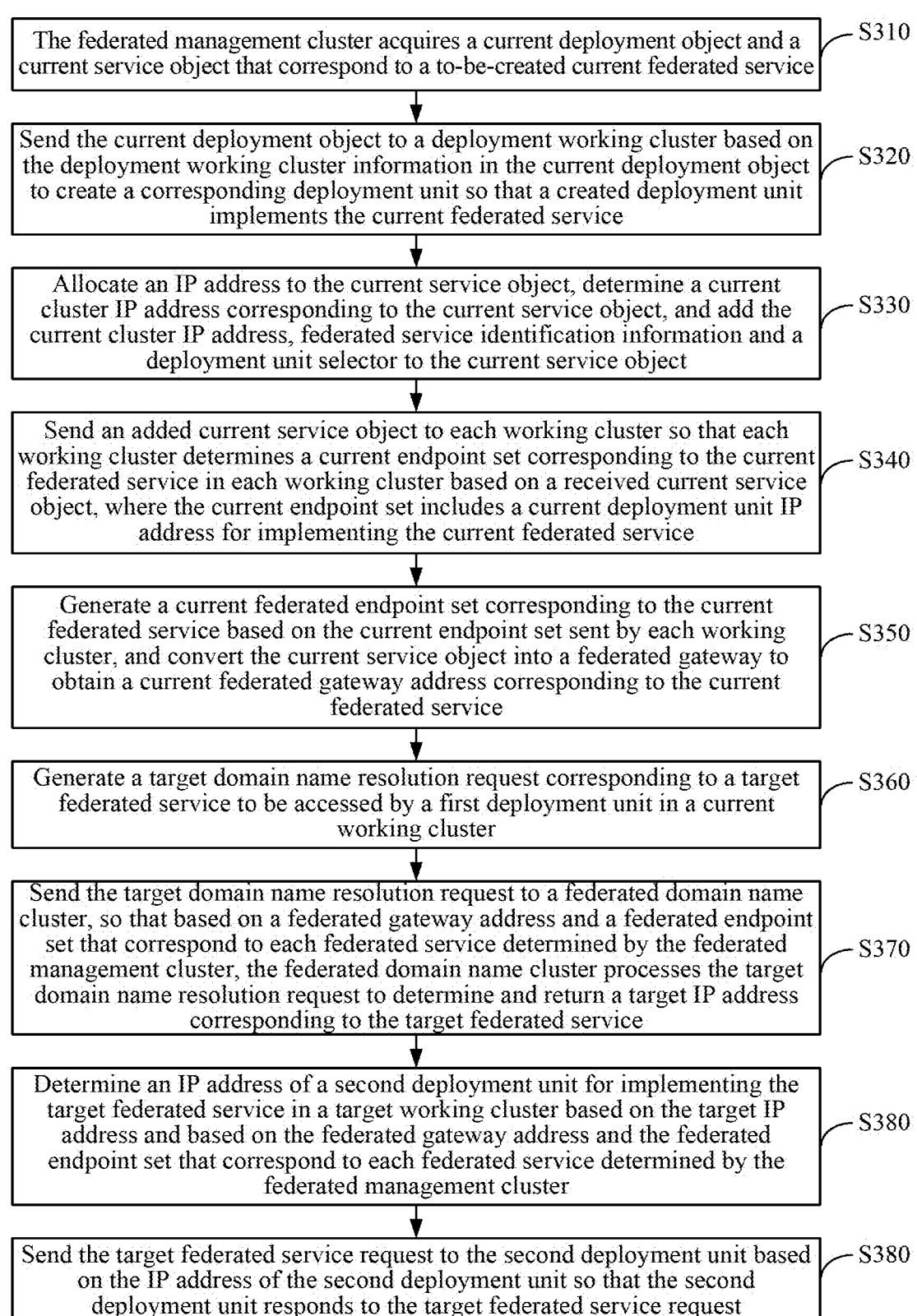

The federated management cluster acquires a current deployment object and a current service object that correspond to a to-be-created current federated service — S310

Send the current deployment object to a deployment working cluster based on the deployment working cluster information in the current deployment object to create a corresponding deployment unit so that a created deployment unit implements the current federated service — S320

Allocate an IP address to the current service object, determine a current cluster IP address corresponding to the current service object, and add the current cluster IP address, federated service identification information and a deployment unit selector to the current service object — S330

Send an added current service object to each working cluster so that each working cluster determines a current endpoint set corresponding to the current federated service in each working cluster based on a received current service object, where the current endpoint set includes a current deployment unit IP address for implementing the current federated service — S340

Generate a current federated endpoint set corresponding to the current federated service based on the current endpoint set sent by each working cluster, and convert the current service object into a federated gateway to obtain a current federated gateway address corresponding to the current federated service — S350

Generate a target domain name resolution request corresponding to a target federated service to be accessed by a first deployment unit in a current working cluster — S360

Send the target domain name resolution request to a federated domain name cluster, so that based on a federated gateway address and a federated endpoint set that correspond to each federated service determined by the federated management cluster, the federated domain name cluster processes the target domain name resolution request to determine and return a target IP address corresponding to the target federated service — S370

Determine an IP address of a second deployment unit for implementing the target federated service in a target working cluster based on the target IP address and based on the federated gateway address and the federated endpoint set that correspond to each federated service determined by the federated management cluster — S380

Send the target federated service request to the second deployment unit based on the IP address of the second deployment unit so that the second deployment unit responds to the target federated service request — S380

FIG. 3

| Domain name resolution request generation module | — 510 |
| Domain name resolution request sending module | — 520 |
| Deployment unit IP address determination module | — 530 |
| Federated service request sending module | — 540 |

SERVICE REQUEST PROCESSING METHOD, APPARATUS AND SYSTEM, DEVICE, AND STORAGE MEDIUM FOR CROSS-CLUSTER SERVICE ACCESS

CROSS-REFERENCE TO RELATED APPLICATION(S)

This application claims priority to Chinese Patent Application No. 202311773836.0 filed Dec. 21, 2023, the disclosure of which is incorporated herein by reference in its entirety.

TECHNICAL FIELD

Embodiments of the present disclosure relate to computer technologies, and in particular to, a service request processing method, apparatus and system, a device, and a storage medium.

BACKGROUND

With the rapid development of computer technologies and cloud native technologies, a container orchestration cluster may be used for efficiently orchestrating and managing the full life cycle of containerized applications in a cloud platform. For example, a Kubernetes cluster is utilized to manage deployment units on multiple deployment nodes in the cloud platform, so that the deployment of the container is simpler and more efficient.

At present, a service access is usually implemented inside each container orchestration cluster, that is, a deployment unit in the same deployment orchestration cluster may only access other deployment units inside the cluster, and the other deployment units may only process service requests generated inside the cluster.

However, in the process of implementing the present disclosure, the inventor finds that at least following problems exist in the related art. The existing method only achieves the intra-cluster service access, and cannot achieves the cross-cluster service access, that is, a deployment unit in one container orchestration cluster cannot access the service of a deployment unit in another container orchestration cluster, which increases the limitation of the service access.

SUMMARY

Embodiments of the present disclosure provide a service request processing method, apparatus and system, a device, and a storage medium, to implement a cross-cluster service access, thereby reducing the limitations of service accesses and satisfying the requirements of personalized services.

According to a first aspect, an embodiment of the present disclosure provides a service request processing method applied to each working cluster managed by a federated management cluster. The method includes that: a target domain name resolution request corresponding to a target federated service to be accessed by a first deployment unit in a current working cluster is generated; the target domain name resolution request is sent to a federated domain name cluster, so that based on a federated gateway address and a federated endpoint set that correspond to each federated service determined by the federated management cluster, the federated domain name cluster processes the target domain name resolution request to determine and return a target internet protocol (IP) address corresponding to the target federated service, where the federated gateway address is a cluster IP address allocated to a federated service, and the federated endpoint set includes deployment unit IP addresses for implementing a federated service in each working cluster; an IP address of a second deployment unit for implementing the target federated service in a target working cluster is determined based on the target IP address and based on the federated gateway address and the federated endpoint set that correspond to each federated service determined by the federated management cluster; and the target federated service request is sent to the second deployment unit based on the IP address of the second deployment unit so that the second deployment unit responds to the target federated service request.

According to a second aspect, an embodiment of the present disclosure further provides a service request processing apparatus integrated into each working cluster managed by a federated management cluster. The service request processing apparatus includes a domain name resolution request generation module, a domain name resolution request sending module, a deployment unit IP address determination module and a federated service request sending module. The domain name resolution request generation module is configured to generate a target domain name resolution request corresponding to a target federated service to be accessed by a first deployment unit in a current working cluster. The domain name resolution request sending module is configured to send the target domain name resolution request to a federated domain name cluster, so that based on a federated gateway address and a federated endpoint set that correspond to each federated service determined by the federated management cluster, the federated domain name cluster processes the target domain name resolution request to determine and return a target internet protocol (IP) address corresponding to the target federated service, where the federated gateway address is a cluster IP address allocated to a federated service, and the federated endpoint set includes deployment unit IP addresses for implementing a federated service in each working cluster. The deployment unit IP address determination module is configured to, based on the target IP address and based on the federated gateway address and the federated endpoint set that correspond to each federated service determined by the federated management cluster, determine an IP address of a second deployment unit for implementing the target federated service in a target working cluster. The federated service request sending module is configured to, based on the IP address of the second deployment unit, send the target federated service request to the second deployment unit, so that the second deployment unit responds to the target federated service request.

According to a third aspect, an embodiment of the present disclosure further provides a service request processing system. The system includes a federated management cluster, multiple working clusters, and a federated domain name cluster. The federated management cluster is configured to manage each working cluster and determine a federated gateway address and a federated endpoint set that correspond to each federated service. Each working cluster is configured to implement the service request processing method provided in any of the embodiments of the present disclosure.

According to a fourth aspect, an embodiment of the present disclosure further provides an electronic device. The electronic device includes one or more processors and a memory configured to store one or more programs. The one or more programs, when executed by the one or more processors, cause the one or more processors to implement the service request processing method provided in any of the embodiments of the present disclosure.

According to a fifth aspect, an embodiment of the present disclosure further provides a computer-readable storage medium storing a computer program. The program, when executed by a processor, implements the service request processing method provided in any of the embodiments of the present disclosure.

In this disclosure, the federated management cluster is configured to manage each working cluster and determine the federated gateway address and the federated endpoint set that correspond to each federated service, so that based on the federated gateway address and the federated endpoint set that correspond to each federated service, the federated domain name cluster may process the target domain name resolution request corresponding to the target federated service to be accessed by the first deployment unit in the current working cluster to determine and return the target IP address corresponding to the target federated service. The current working cluster determines the IP address of the second deployment unit for implementing the target federated service in the target working cluster based on the target IP address returned by the federated domain name cluster and based on the federated gateway address and the federated endpoint set that correspond to each federated service determined by the federated management cluster, and the target federated service request is sent to the second deployment unit based on the IP address of the second deployment unit so that the second deployment unit responds to the target federated service request. The target federated cluster may be different from the current federated cluster; therefore, the cross-cluster service access is achieved, the limitations of service accesses are further reduced, and the requirements of personalized services are satisfied.

BRIEF DESCRIPTION OF DRAWINGS

In order to describe technical solutions in embodiments of the present disclosure or in the related art more clearly, the drawings used for describing the embodiments or the related art will be briefly introduced below. Apparently, the drawings in the following description are merely some embodiments of the present disclosure. For those of ordinary skill in the art, other drawings may also be obtained according to these drawings without creative labor.

FIG. 1 is a flowchart of a service request processing method according to an embodiment of the present disclosure;

FIG. 3 is a flowchart of another service request processing method according to an embodiment of the present disclosure;

DETAILED DESCRIPTION

Figure 2:
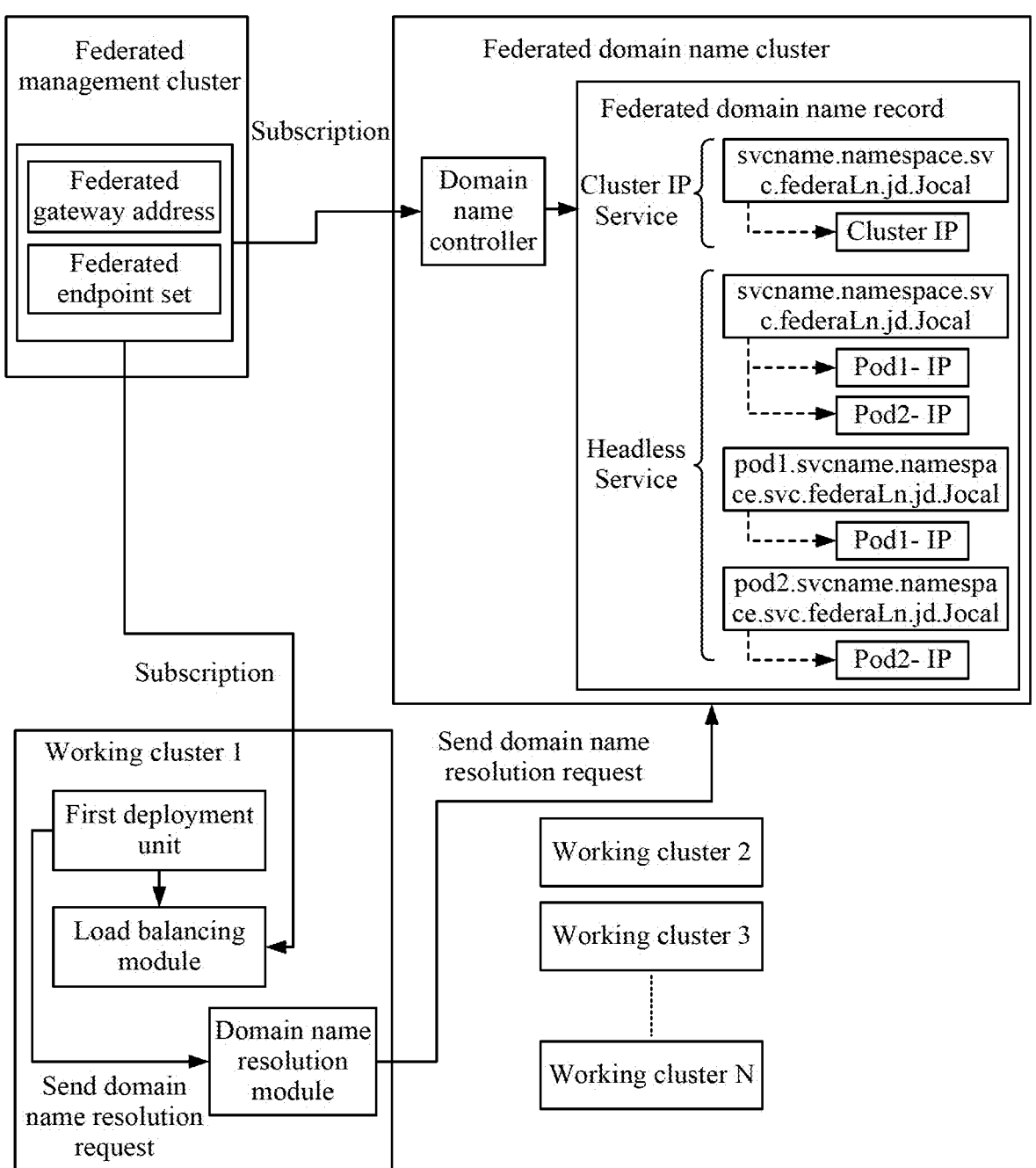
FIG. 2 is an example diagram of a service request processing process according to an embodiment of the present disclosure.

The present disclosure is further described hereinafter in detail in conjunction with drawings and embodiments. It is to be understood that the embodiments described herein are intended to explain the present disclosure and not to limit the present disclosure. Additionally, it is to be noted that for ease of description, only part, not all, of the structures related to the present disclosure are illustrated in the drawings.

FIG. 1 is a flowchart of a service request processing method according to an embodiment of the present disclosure. This embodiment may be applicable to a case that a cross-cluster access is performed between multiple working clusters managed by a federated management cluster. The method may be performed by a service request processing apparatus, and the apparatus may be implemented by software and/or hardware and is integrated into each working cluster managed by the federated management cluster.

The federated management cluster may be used as a federated main cluster and is used for providing a cross-cloud multi-cluster unified management, a unified deployment application, a cross-cluster elastic expansion and the like. The working cluster may be a federated sub-cluster for executing a workload of a deployment unit. The federated management cluster is the concept of abstracting a layer of clusters over the multiple working clusters. The federated management cluster may uniformly manage the multiple working clusters, so that a cross-cluster service access can be performed among the multiple working clusters. The multiple working clusters may be cross-regional, cross-cloud vendor, or may be used for internal self-built clusters. The federated management cluster and each working cluster may be each a container orchestration cluster, such as a Kubernetes cluster, so that the cross-cluster access capability of the federated cluster can be realized by using the native service resource and the workload, and thus the usage habit of the single cluster is compatible to the maximum extent.

As shown in FIG. 1, the method includes the following steps.

In S110, a target domain name resolution request corresponding to a target federated service to be accessed by a first deployment unit in a current working cluster is generated.

The current working cluster may be any one working cluster that currently requires a service access. Each working cluster includes multiple deployment nodes. Each deployment node is a device for actually deploying the containerized application. One or more deployment unit Pods may be created on each deployment node. The deployment unit Pod is a minimum deployment unit created and managed in the deployment node. One container may be run in each deployment unit, or multiple containers may be run simultaneously in each deployment unit. The first deployment unit refers to a deployment unit that needs to perform the service access in the current working cluster. A federated service is a service that may be accessed across clusters. The target federated service refers to a federated service that the first deployment unit currently needs to access. The target domain name resolution request may be a request used for resolving a target federated service domain name.

When the first deployment unit in the current working cluster needs to access the target federated service, the target domain name resolution request corresponding to the target federated service may be firstly generated for a service domain name resolution.

In some embodiments, S110 may include: generating a current domain name resolution request corresponding to a service to be accessed by the first deployment unit of the current working cluster. If it is detected that service identification information corresponding to the service to be accessed is target federated service identification information, the current domain name resolution request is determined to be the target domain name resolution request corresponding to the target federated service.

The service to be accessed may be the federated service, so that the cross-cluster access is allowed. The service to be accessed may also be a non-federated service, so that only an intra-cluster access may be performed. The target federated service identification information may be identification information for characterizing the federated service.

Referring to FIG. 2, a first deployment unit in a previous working cluster (such as, a working cluster 1) may access the federated service, or may access the non-federated service. Therefore, after the current domain name resolution request corresponding to the service to be accessed is generated, the first deployment unit may send the current domain name resolution request to a domain name resolution module for a service domain name resolution. If the domain name resolution module detects that the service identification information corresponding to the service to be accessed is the target federated service identification information, the service to be accessed is determined to be the target federated service, and correspondingly, the current domain name resolution request is determined to be the target domain name resolution request corresponding to the target federated service.

It is to be noted that the domain name resolution module inside the working cluster may only resolve a service domain name accessed inside the cluster, and cannot resolve a domain name of the federated service. If the domain name resolution module detects that the service identification information corresponding to the service to be accessed is non-federated service identification information, the domain name resolution and the normal intra-cluster service access may be directly performed on the current domain name resolution request.

In S120, the target domain name resolution request is sent to a federated domain name cluster, so that based on a federated gateway address and a federated endpoint set that correspond to each federated service determined by the federated management cluster, the federated domain name cluster processes the target domain name resolution request to determine and return a target internet protocol (IP) address corresponding to the target federated service.

The federated gateway address refers to a cluster IP address allocated to the federated service. The federated endpoint set includes a deployment unit IP address for implementing the federated service in each working cluster. Each federated service corresponds to one federated gateway address and one federated endpoint set. A federated gateway is a predefined data structure that may include a cluster IP address of the federated service, a port, and a name of a corresponding federated endpoint set. The federated endpoint set is also a predefined data structure, including IP addresses and port information of all deployment unit Pods for implementing the federated service in all working clusters. The federated gateway address and data in the federated endpoint set are global data corresponding to all working clusters to support the cross-cluster service access. The federated domain name cluster may be a cluster used for resolving a federated service domain name. The target IP address is an IP address obtained after the federated domain name cluster resolves a domain name of the target federated service. The target IP address is a destination address of the request. The target IP address may be a specific cluster IP address, or may be a specific deployment unit IP address.

The federated gateway address and the federated endpoint set that correspond to each federated service may be determined by the federated management cluster. A domain name controller in the federated domain name cluster may obtain the federated gateway address and the federated endpoint set that correspond to each federated service in a manner of subscribing to the federated gateway address and the federated endpoint set that correspond to each federated service from the federated management cluster, and a corresponding federated domain name record is generated based on the federated gateway address and the federated endpoint set that correspond to each federated service, as shown in FIG. 2. After the domain name resolution module in the current working cluster determines that the service to be accessed is the target federated service, the target domain name resolution request corresponding to the target federated service may be forwarded to the federated domain name cluster for a domain name resolution of the federated service. The federated domain name cluster may resolve the federated service domain name in the target domain name resolution request into a corresponding target IP address based on the federated gateway address and the federated endpoint set that correspond to each federated service. For example, the federated service domain name in the target domain name resolution request may be resolved into a corresponding target IP address based on the federated domain name record, and the target IP address may be sent to the current working cluster.

In some embodiments, "based on the federated gateway address and the federated endpoint set that correspond to each federated service determined by the federated management cluster, processing the target domain name resolution request to determine and return the target IP address corresponding to the target federated service" in S120 may include: resolving the target domain name resolution request to obtain a target service type corresponding to the target federated service; and based on the target service type and based on the federated gateway address and the federated endpoint set that correspond to each federated service determined by the federated management cluster, performing a domain name resolution to determine a target IP address corresponding to a resolved target federated service.

The target service type may be a service type to which the target federated service belongs. For example, the target service type may be a ClusterIP service type or a Headless service type. One cluster IP address may be allocated to a federated service of the ClusterIP service type. A federated service of the Headless service type is one headless service, which neither allocates a cluster IP address nor exposes a port to the outside.

The federated domain name cluster may generate a domain name resolution record corresponding to each service type based on the federated gateway address and the federated endpoint set that correspond to each federated service determined by the federated management cluster, as shown in FIG. 2. After the federated domain name cluster resolves the received target domain name resolution request, the target service type corresponding to the target federated service is obtained, and the domain name of the target federated service is resolved based on the target domain name resolution record corresponding to the target service type, to obtain the target IP address corresponding to the resolved target federated service.

For example, based on the target service type and based on the federated gateway address and the federated endpoint set that correspond to each federated service determined by the federated management cluster, performing the domain name resolution to determine the target IP address corresponding to the resolved target federated service may include: in a case where the target service type is a ClusterIP service type, determining a target federated gateway address corresponding to the target federated service based on the federated gateway address corresponding to each federated service determined by the federated management cluster, and determining a target cluster IP address corresponding to the target federated gateway address as the target IP address; and in a case where the target service type is a Headless service type, determining a target federated endpoint set corresponding to the target federated service based on the federated endpoint set corresponding to each federated service determined by the federated management cluster, and determining all the deployment unit IP addresses in the target federated endpoint set as target IP addresses.

As shown in FIG. 2, for the federated service of the ClusterIP service type, a server domain name may be resolved to be a cluster IP address corresponding to the federated service based on the federated gateway address corresponding to each federated service subscribed from the federated management cluster. For the federated service of the Headless service type, the server domain name may be resolved to be all deployment unit IP addresses for implementing the federated service in all working clusters based on the federated endpoint set corresponding to each federated service subscribed from the federated management cluster. When the target service type is the ClusterIP service type, the target cluster IP address of the target federated gateway address corresponding to the target federated service may be determined as the target IP address based on the domain name resolution record corresponding to the ClusterIP service type. The target federated gateway address is the same as the target cluster IP address allocated to the target federated service. When the target service type is the Headless service type, all deployment unit IP addresses in the target federated endpoint set corresponding to the target federated service may be determined as the target IP address based on the domain name resolution record corresponding to the Headless service type.

In S130, an IP address of a second deployment unit for implementing the target federated service in a target working cluster is determined based on the target IP address and based on the federated gateway address and the federated endpoint set that correspond to each federated service determined by the federated management cluster.

The target working cluster may be a working cluster finally accessed by the current working cluster. The second deployment unit is a deployment unit selected from all deployment units for implementing the target federated service in the target working cluster. The second deployment unit is a deployment unit that is ultimately configured to process a target service request. The target working cluster may be different from the current working cluster, thereby implementing the cross-cluster service access. The target working cluster may also be the same as the current working cluster. For example, if a deployment unit for implementing the target federated service also exists in the current working cluster, the current working cluster may also be used as the target working cluster, and one deployment unit for implementing the target federated service in the current working cluster is used as the second deployment unit, so that the intra-cluster service access may also be implemented.

The current working cluster may subscribe in advance, from the federated management cluster, to the federated gateway address and the federated endpoint set that correspond to each federated service, so that the current working cluster may obtain the federated gateway address and the federated endpoint set that correspond to each federated service determined by the federated management cluster. A load balancing is performed based on the target IP address returned by the federated domain name cluster, the federated gateway address corresponding to each federated service that is subscribed from the federated management cluster, and the federated endpoint set, to determine the IP address of the second deployment unit for implementing the target federated service in the ultimately accessed target working cluster.

In some embodiments, S130 may include: in a case where a target IP address is detected to be a target cluster IP address based on the federated gateway address corresponding to each federated service determined by the federated management cluster, performing load balancing based on the target cluster IP address and based on the federated endpoint set corresponding to each federated service determined by the federated management cluster, and determining the IP address of the second deployment unit for implementing the target federated service in the target working cluster; and in a case where target IP addresses are detected to be multiple deployment unit IP addresses, determining, from the multiple deployment unit IP addresses, the IP address of the second deployment unit for implementing the target federated service in the target working cluster.

Referring to FIG. 2, a load balancing module in the current working cluster (such as, the working cluster 1) may subscribe in advance, from the federated management cluster, to the federated gateway address and the federated endpoint set that correspond to each federated service, so that the federated gateway address and the federated endpoint set that correspond to each federated service are obtained. The load balancing module may detect, based on the federated gateway address corresponding to each federated service obtained by means of pre-subscription, whether the target IP address returned by the federated domain name cluster is the target cluster IP address. If the target IP address returned by the federated domain name cluster is the target cluster IP address, the target federated endpoint set corresponding to the target cluster IP address is determined based on the federated endpoint set corresponding to each federated service obtained by means of pre-subscription, and a proper deployment unit IP address is selected, based on a load balancing policy, from all deployment unit IP addresses corresponding to all working clusters contained in the target federated endpoint set as the IP address of the second deployment unit, where a working cluster where the second deployment unit is located is used as the target working cluster, thereby ensuring the global workload balancing, and further improving a processing speed of the service request. The load balancing module may detect whether the target IP address returned by the federated domain name cluster is one of the multiple deployment unit IP addresses. If the target IP address returned by the federated domain name cluster is the one of the multiple deployment unit IP addresses, a proper deployment unit IP address is selected, based on the load balancing policy, from the multiple deployment unit IP addresses as the IP address of the second deployment unit, and a working cluster where the second deployment unit is located is used as the target working cluster, thereby also ensuring the global workload balancing, and further improving the processing speed of the service request.

In S140, the target federated service request is sent to the second deployment unit based on the IP address of the second deployment unit so that the second deployment unit to respond to the target federated service request.

The first deployment unit in the current working cluster sends the target federated service request by using the target IP address as a destination address. The load balancing module in the current working cluster may intercept the target federated service request, and convert the target IP address in the target federated service request into the IP address of the second deployment unit, so that the target federated service request is sent by using the IP address of the second deployment unit as the destination address, and the target federated service request is sent to the second deployment unit in the target working cluster, so that the second deployment unit responds to the target federated service request, thereby implementing the service access between the multiple working clusters and achieving the purpose of global load balancing.

In the technical solution of this embodiment, the federated management cluster is configured to manage each working cluster and determine the federated gateway address and the federated endpoint set that correspond to each federated service, so that based on the federated gateway address and the federated endpoint set that correspond to each federated service, the federated domain name cluster may process the target domain name resolution request corresponding to the target federated service to be accessed by the first deployment unit in the current working cluster to determine and return the target IP address corresponding to the target federated service. The current working cluster determines the IP address of the second deployment unit for implementing the target federated service in the target working cluster based on the target IP address returned by the federated domain name cluster and based on the federated gateway address and the federated endpoint set that correspond to each federated service determined by the federated management cluster, and the target federated service request is sent to the second deployment unit based on the IP address of the second deployment unit, so that the second deployment unit responds to the target federated service request. The target federated cluster may be different from the current federated cluster; therefore, the cross-cluster service access is achieved, the limitations of service accesses are further reduced, and the requirements of personalized services are satisfied.

FIG. 3 is a flowchart of another service request processing method according to an embodiment of the present disclosure. In this embodiment, based on the above-described embodiments, a process of determining the federated gateway address and the federated endpoint set that correspond to each federated service is described in detail. The explanations of terms that are the same as or corresponding to the above-described embodiments are not repeated herein.

Referring to FIG. 3, another service request processing method provided in this embodiment includes the following steps.

In S310, the federated management cluster acquires a current deployment object and a current service object that correspond to a to-be-created current federated service.

The current federated service may refer to a federated service that currently needs to be created. The current deployment object may be deployment declaration informa-tion corresponding to the deployment unit for implementing the current federated service. The current service object may refer to service information of a current federated service to be created.

Figure 4:
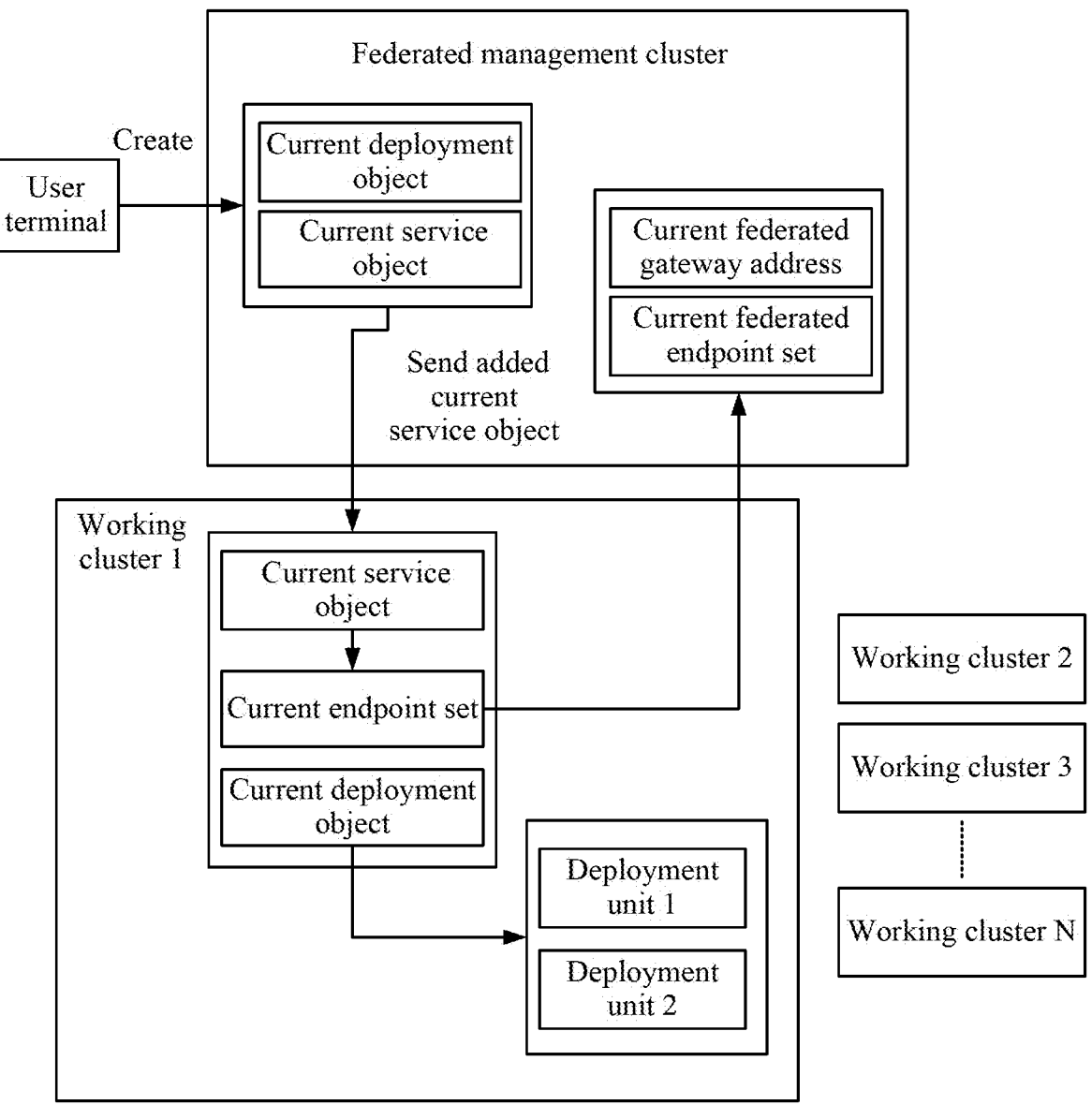
FIG. 4 is an example diagram of a determining process of a federated gateway address and a federated endpoint set according to an embodiment of the present disclosure.

Referring to FIG. 4, a user may create, by using a user end (such as, a client or a web page), in the federated management cluster, a current deployment object corresponding to the current federated service and a current service object corresponding to the current federated service, so that the federated management cluster obtains the current deployment object and the current service object.

In S320, the current deployment object is sent to a deployment working cluster based on the deployment working cluster information in the current deployment object to create a corresponding deployment unit so that a created deployment unit implements the current federated service.

The current deployment object may include at least one piece of deployment working cluster information for implementing the current federated service and information such as the number of deployment units created in each deployment working cluster, affinity of the deployment units, and a system architecture of the deployment units (such as, an arm64 or an amd64). The deployment working cluster may be a working cluster in which a deployment unit that is used for implementing the current federated service and needs to be created is located. The deployment working cluster may be all working clusters so that all working clusters support access to the current federated service. The deployment working cluster may also be part of the working cluster, so that only part of the working cluster supports access to the current federated service.

The federated management cluster may send the current deployment object to each configured deployment working cluster based on the deployment working cluster information in the current deployment object, so that each deployment working cluster may create, based on the delivered deployment unit information in the current deployment object, a deployment unit for implementing the current federated service, the resource allocation is performed based on the current deployment object in the deployment working cluster, and the deployment unit is run as required. The deployment unit of the current deployment object is allocated to run in multiple deployment working clusters. For example, referring to FIG. 4, the working cluster 1 is a deployment working cluster, and the working cluster 1 may create two deployment units based on the delivered current deployment object.

In S330, an IP address is allocated to the current service object, a current cluster IP address corresponding to the current service object is determined, and the current cluster IP address, federated service identification information and a deployment unit selector are added to the current service object.

The federated service identification information may be used for identifying that the service object is delivered by the federated management cluster, so that the working cluster may identify, based on the federated service identification information, an endpoint set corresponding to the federated service. The deployment unit selector may be a deployment unit for screening for an implementation of the current federated service.

The federated management cluster may randomly select a cluster IP address from a reserved cluster IP address segment as the current cluster IP address corresponding to the current service object. The allocated current cluster IP address, the federated service identification information, and the deployment unit selector are added to the current service object.

In S340, an added current service object is sent to each working cluster so that each working cluster determines a current endpoint set corresponding to the current federated service in each working cluster based on a received current service object, where the current endpoint set includes a current deployment unit IP address for implementing the current federated service.

Referring to FIG. 4, the federated management cluster sends an added current service object to each working cluster. Each working cluster may determine, based on the deployment unit selector in the received current service object, IP addresses of all current deployment units for implementing the current federated service in each working cluster, so that the current endpoint set corresponding to the current federated service in each working cluster is generated. Each working cluster may send a generated current endpoint set to the federated management cluster. For example, the working cluster 1 in FIG. 4 generates the current endpoint set based on the deployment unit selector in the current service object, and sends the current endpoint set to the federated management cluster.

It is to be noted that if a certain working cluster does not screen out a deployment unit for implementing the current federated service based on the deployment unit selector in the current service object, it indicates that the working cluster is not a deployment working cluster corresponding to the current federated service. In this case, an endpoint set generated by the working cluster is an empty set, so that the working cluster does not need to send the endpoint set to the federated management cluster.

In some embodiments, "determining, by each working cluster, the current endpoint set corresponding to the current federated service in each working cluster based on the received current service object" in S340 may include: determining, by each working cluster, a current deployment unit for implementing the current federated service, from the created deployment unit and based on the deployment unit selector in the received current service object; and determining the current endpoint set corresponding to the current federated service in each working cluster based on the current deployment unit IP address.

Each working cluster detects, based on the received deployment unit selector in the current service object, whether each created deployment unit satisfies a selection condition corresponding to the deployment unit selector. If the selection condition is satisfied, it indicates that the deployment unit is the current deployment unit for implementing the current federated service, so that the deployment unit selector may be used to determine whether the current deployment unit for implementing the current federated service exists in each working cluster, and the screened IP address of the current deployment unit is stored in the current endpoint set, to generate the current endpoint set corresponding to the current federated service in each working cluster.

In S350, a current federated endpoint set corresponding to the current federated service is generated based on the current endpoint set sent by each working cluster, and the current service object is converted into a federated gateway, to obtain a current federated gateway address corresponding to the current federated service.

Referring to FIG. 4, the federated management cluster may acquire a current endpoint set corresponding to a current federated service sent by each working cluster. The federated management cluster combines all acquired current endpoint sets to obtain the current federated endpoint set corresponding to the current federated service and further obtain the global information of all working clusters. A cluster IP address in each working cluster changes; therefore, the current service object corresponding to the current federated service needs to be converted into the federated gateway, to obtain the current federated gateway address corresponding to the current federated service. The federated gateway address is the current cluster IP address allocated to the current service object.

The federated gateway address and the federated endpoint set that correspond to each federated service may be determined in a manner of determining the current federated gateway address and the current federated endpoint set corresponding to the current federated service described in the above steps S310 to S350.

It is be noted that each working cluster and the federated domain name cluster may subscribe to the federated gateway address and the federated endpoint set that correspond to each federated service in the federated management cluster, so that each working cluster and the federated domain name cluster may obtain the global information of all working clusters, thereby implementing the cross-cluster service access.

In S360, a target domain name resolution request corresponding to a target federated service to be accessed by a first deployment unit in a current working cluster is generated.

In S370, the target domain name resolution request is sent to a federated domain name cluster, so that based on a federated gateway address and a federated endpoint set that correspond to each federated service determined by the federated management cluster, the federated domain name cluster processes the target domain name resolution request to determine and return a target IP address corresponding to the target federated service.

In S380, an IP address of a second deployment unit for implementing the target federated service in a target working cluster is determined based on the target IP address and based on the federated gateway address and the federated endpoint set that correspond to each federated service determined by the federated management cluster.

In S390, the target federated service request is sent to the second deployment unit based on the IP address of the second deployment unit so that the second deployment unit responds to the target federated service request.

In the technical solution of this embodiment, the federated management cluster acquires the current deployment object and the current service object corresponding to the to-be-created current federated service; the current deployment object is sent to the deployment working cluster based on the deployment working cluster information in the current deployment object to create the corresponding deployment unit so that the created deployment unit implements the current federated service; the IP address is allocated to the current service object, the current cluster IP address corresponding to the current service object is determined, and the current cluster IP address, the federated service identification information and the deployment unit selector are added to the current service object; the added current service object is sent to each working cluster, and each working cluster is enabled to determine the current endpoint set corresponding to the current federated service in each working cluster based on the received current service object; the current federated endpoint set corresponding to the current federated service is generated by the federated management cluster based on the current endpoint set sent by each working cluster, and the current service object is converted into a federated gateway, to obtain the current federated gateway address corresponding to the current federated service, and thus, the federated gateway address and the federated endpoint set that correspond to each federated service may be determined by the federated management cluster, thereby achieving the cross-cluster service discovery, in addition, each working cluster and the federated domain name cluster may obtain the global information about all working clusters in the federated management cluster, thereby achieving the cross-cluster service access.

The following is an embodiment of the service request processing apparatus provided in the embodiments of the present disclosure. The apparatus and the service request processing method in the above-described embodiments belong to the same invention concept. For details that are not described in detail in the embodiments of the service request processing apparatus, reference may be made to the embodiments of the service request processing method described above.

Figure 5:
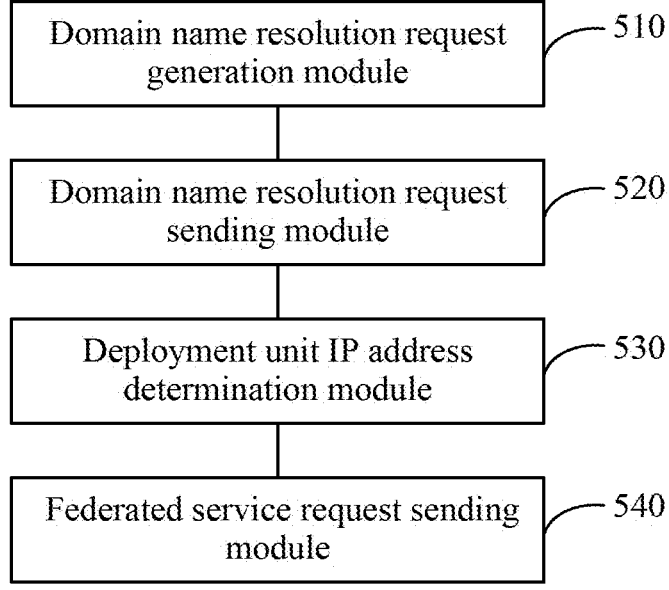
FIG. 5 is a schematic structural diagram of a service request processing apparatus according to an embodiment of the present disclosure.

FIG. 5 is a schematic structural diagram of a service request processing apparatus according to an embodiment of the present disclosure. This embodiment may be applicable to a case in which cross-cluster access is performed between multiple working clusters managed by a federated management cluster. As shown in FIG. 5, the apparatus includes a domain name resolution request generation module 510, a domain name resolution request sending module 520, a deployment unit IP address determination module 530, and a federated service request sending module 540.

The domain name resolution request generation module 510 is configured to generate a target domain name resolution request corresponding to a target federated service to be accessed by a first deployment unit in a current working cluster. The domain name resolution request sending module 520 is configured to send the target domain name resolution request to a federated domain name cluster, so that based on a federated gateway address and a federated endpoint set that correspond to each federated service determined by the federated management cluster, the federated domain name cluster processes the target domain name resolution request to determine and return a target internet protocol (IP) address corresponding to the target federated service, where the federated gateway address is a cluster IP address allocated to a federated service, and the federated endpoint set includes deployment unit IP addresses for implementing a federated service in each working cluster. The deployment unit IP address determination module 530 is configured to, based on the target IP address and based on the federated gateway address and the federated endpoint set that correspond to each federated service determined by the federated management cluster, determine an IP address of a second deployment unit for implementing the target federated service in a target working cluster. The federated service request sending module 540 is configured to, based on the IP address of the second deployment unit, send the target federated service request to the second deployment unit so that the second deployment unit responds to the target federated service request.

In the technical solution of this embodiment, the federated management cluster is configured to manage each working cluster and determine the federated gateway address and the federated endpoint set that correspond to each federated service, so that based on the federated gateway address and the federated endpoint set that correspond to each federated service, the federated domain name cluster may process the target domain name resolution request corresponding to the target federated service to be accessed by the first deployment unit in the current working cluster to determine and return the target IP address corresponding to the target federated service. The current working cluster determines the IP address of the second deployment unit for implementing the target federated service in the target working cluster based on the target IP address returned by the federated domain name cluster and based on the federated gateway address and the federated endpoint set that correspond to each federated service determined by the federated management cluster, and the target federated service request is sent to the second deployment unit based on the IP address of the second deployment unit, so that the second deployment unit responds to the target federated service request. The target federated cluster may be different from the current federated cluster; therefore, the cross-cluster service access is achieved, the limitations of service accesses are further reduced, and the requirements of personalized services are satisfied.

Optionally, the domain name resolution request generation module 510 is configured to: generate a current domain name resolution request corresponding to a service to be accessed by the first deployment unit in the current working cluster; and in response to detecting that service identification information corresponding to the service to be accessed is target federated service identification information, determine that the current domain name resolution request is the target domain name resolution request corresponding to the target federated service.

Optionally, the federated domain name cluster includes a request resolution module and a federated domain name resolution module. The request resolution module is configured to resolve the target domain name resolution request to obtain a target service type corresponding to the target federated service The federated domain name resolution module is configured to perform, based on the target service type and based on the federated gateway address and the federated endpoint set that correspond to each federated service determined by the federated management cluster, a domain name resolution to determine a target IP address corresponding to a resolved target federated service.

Optionally, the federated domain name resolution module is configured to: in a case where the target service type is a ClusterIP service type, determine a target federated gateway address corresponding to the target federated service based on the federated gateway address corresponding to each federated service determined by the federated management cluster, and determine a target cluster IP address corresponding to the target federated gateway address as the target IP address; and in a case where the target service type is a Headless service type, determine a target federated endpoint set corresponding to the target federated service based on the federated endpoint set corresponding to each federated service determined by the federated management cluster, and determine all the deployment unit IP addresses in the target federated endpoint set as target IP addresses.

Optionally, the deployment unit IP address determination module 530 is configured to: in a case where the target IP address is detected to be a target cluster IP address based on the federated gateway address corresponding to each federated service determined by the federated management cluster, perform load balancing based on the target cluster IP address and based on the federated endpoint set corresponding to each federated service determined by the federated management cluster, and determine the IP address of the second deployment unit for implementing the target federated service in the target working cluster; and in a case where target IP addresses are detected to be multiple deployment unit IP addresses, determine, from the multiple deployment unit IP addresses, the IP address of the second deployment unit for implementing the target federated service in the target working cluster.

Optionally, the federated management cluster may include an object acquisition module, a deployment object sending module, an information adding module, a service object sending module and a global information determination module. The object acquisition module is configured to acquire a current deployment object and a current service object that correspond to a to-be-created current federated service. The deployment object sending module is configured to send the current deployment object to a deployment working cluster based on deployment working cluster information in the current deployment object to create a corresponding deployment unit so that a created deployment unit implements the current federated service. The information adding module is configured to: allocate an IP address to the current service object, determine a current cluster IP address corresponding to the current service object, and add the current cluster IP address, federated service identification information and a deployment unit selector to the current service object. The service object sending module is configured to send an added current service object to each working cluster so that each working cluster determines a current endpoint set corresponding to the current federated service in each working cluster based on a received current service object, where the current endpoint set includes a current deployment unit IP address for implementing the current federated service. The global information determination module is configured to generate, based on the current endpoint set sent by each working cluster, a current federated endpoint set corresponding to the current federated service, and convert the current service object into a federated gateway, to obtain a current federated gateway address corresponding to the current federated service.

Optionally, each working cluster includes an endpoint set determination module. The endpoint set determination module is configured to: determine a current deployment unit for implementing the current federated service, from the created deployment unit and based on the deployment unit selector in the received current service object; and determine the current endpoint set corresponding to the current federated service in each working cluster based on the current deployment unit IP address.

The service request processing apparatus provided in the embodiments of the present disclosure may perform the service request processing method provided in any of the embodiments of the present disclosure, and has corresponding function modules and beneficial effects for performing the service request processing method.

It is to be noted that, the units and modules included in the embodiment of the service request processing apparatus described above are merely divided according to function logic, but are not limited to the above-described division, as long as the corresponding functions can be implemented. In addition, specific names of the function units are merely for the convenience of distinguishing from each other, and are not used for limiting the scope of protection of the present disclosure.

Figure 6:
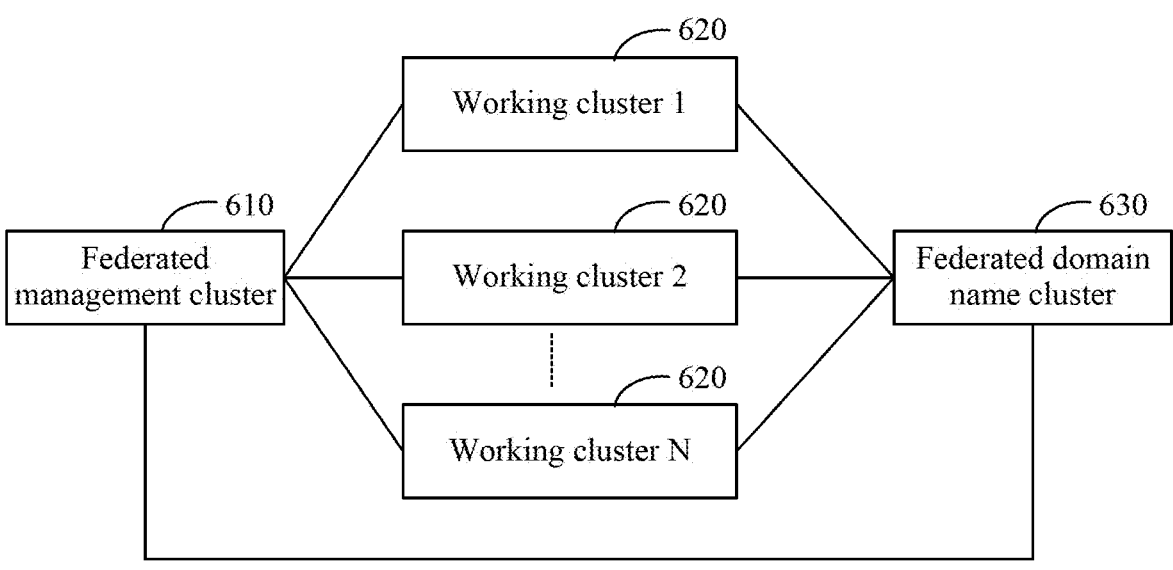
FIG. 6 is a schematic structural diagram of a service request processing system according to an embodiment of the present disclosure.

FIG. 6 is a schematic structural diagram of a service request processing system according to an embodiment of the present disclosure. This embodiment may be applicable to a case where a cross-cluster access is performed between multiple working clusters managed by a federated management cluster. As shown in FIG. 6, the system includes a federated management cluster 610, multiple working clusters 620, and a federated domain name cluster 630.

The federated management cluster 610 is configured to manage each working cluster 620 and determine a federated gateway address and a federated endpoint set that correspond to each federated service. Each working cluster 620 is configured to implement the service request processing method provided in any of the embodiments of the present disclosure. The federated domain name cluster 630 is configured to process a target domain name resolution request corresponding to a target federated service to be accessed by each working cluster based on the federated gateway address and the federated endpoint set that correspond to each federated service determined by the federated management cluster to determine and return a target IP address corresponding to the target federated service.

According to the service request processing system provided in this embodiment, the federated management cluster is configured to manage each working cluster and determine the federated gateway address and the federated endpoint set that correspond to each federated service, so that based on the federated gateway address and the federated endpoint set that correspond to each federated service, the federated domain name cluster may process the target domain name resolution request corresponding to the target federated service to be accessed by the first deployment unit in the current working cluster to determine and return the target IP address corresponding to the target federated service. The current working cluster determines the IP address of the second deployment unit for implementing the target federated service in the target working cluster based on the target IP address returned by the federated domain name cluster and based on the federated gateway address and the federated endpoint set that correspond to each federated service determined by the federated management cluster, and the target federated service request is sent to the second deployment unit based on the IP address of the second deployment unit, so that the second deployment unit responds to the target federated service request. The target federated cluster may be different from the current federated cluster; therefore, the cross-cluster service access is achieved, the limitations of service accesses are further reduced, and the requirements of personalized services are satisfied.

Figure 7:
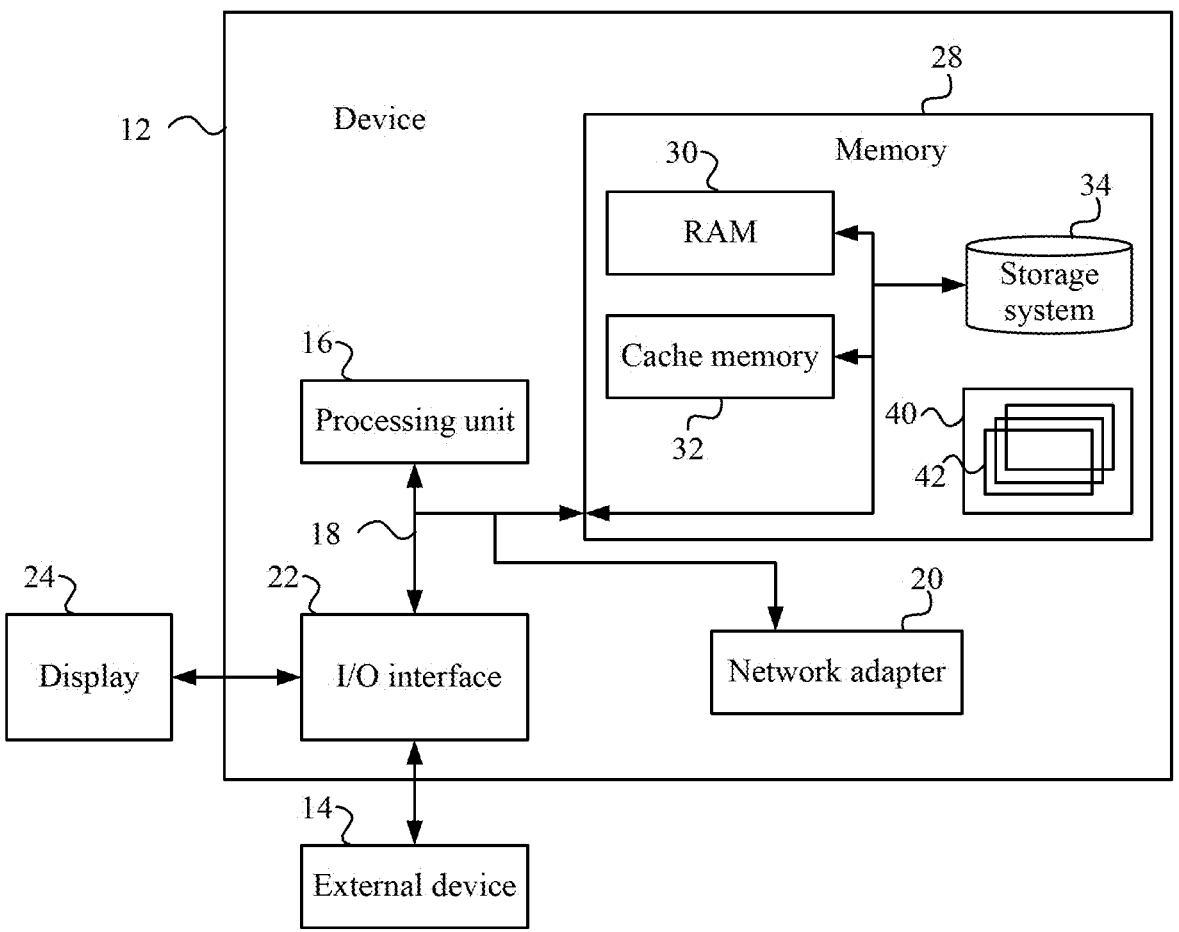
FIG. 7 is a schematic structural diagram of an electronic device according to an embodiment of the present disclosure.

FIG. 7 is a schematic structural diagram of an electronic device according to an embodiment of the present disclosure. FIG. 7 shows a block diagram of an exemplary electronic device 12 adapted to implement embodiments of the present disclosure. The electronic device 12 shown in FIG. 7 is merely an example and should not impose any limitation on the function and the scope of use of the embodiments of the present disclosure.

As shown in FIG. 7, the electronic device 12 is represented as a general computing device. A component of the electronic device 12 may include, but is not limited to, one or more processors or processing units 16, a system memory 28, and a bus 18 that is connected to different system components (including the system memory 28 and the processing unit 16).

The bus 18 represents one or more of several types of bus structures, including a memory bus or a memory controller, a peripheral bus, a graphics acceleration port, a processor, or a local bus that uses any of a variety of bus architectures. By way of example, such architectures include, but are not limited to, an industry standard architecture (ISA) bus, a micro channel architecture (MCA) bus, an enhanced ISA bus, a video electronics standards association (VESA) local bus, and a peripheral component interconnect (PCI) bus.

The electronic device 12 typically includes multiple computer system readable media. These media may be any available media that may be accessed by the electronic device 12, including volatile and non-volatile media and removable and non-removable media.

The system memory 28 may include a computer system readable medium in the form of a volatile memory, such as a random access memory (RAM) 30 and/or a cache memory 32. The electronic device 12 may further include other removable/non-removable, volatile/nonvolatile computer system storage media. By way of example only, the storage system 34 may be configured to read from and write to a non-removable, nonvolatile magnetic medium (commonly referred to as a "hard drive"). A magnetic disk drive for reading from or writing to a removable, non-volatile magnetic disk (such as, a "floppy disk"), and an optical disk drive for reading from or writing to a removable, non-volatile optical disk (such as, a CD-ROM, a DVD-ROM, or other optical media) may be provided. In these cases, each driver may be connected to the bus 18 by one or more data media interfaces. The system memory 28 may include at least one program product having a set of program modules (such as, at least one program module), and these program modules are configured to perform functions of the embodiments of the present disclosure.

A program/utility tool 40 having a set of program modules 42 (at least one program module) may be stored in, such as, the system memory 28. Such program module 42 includes, but is not limited to, an operating system, one or more application programs, other program modules, and program data. Each example or a combination of these examples may include an implementation of a network environment. The program module 42 generally performs functions and/or methods in the embodiments described in the present disclosure.

The electronic device 12 may also communicate with one or more external devices 14 (such as, a keyboard, a pointing device, or a display 24), or may also communicate with one or more devices that enable the user to interact with the electronic device 12, and/or may also communicate with any device (such as, a network adapter, a modem) that enables the electronic device 12 to communicate with one or more other computing devices. This communication may be performed by using an input/output (I/O) interface 22. In addition, the electronic device 12 may further communicate with one or more networks (such as, a local area network (LAN), a wide area network (WAN), and/or a public network such as the Internet) through the network adapter 20. As shown in the drawings, the network adapter 20 communicates with other modules of the electronic device 12 through the bus 18. It is to be understood that, other hardware and/or software modules may be used in combination with the electronic device 12, and the other hardware and/or software modules include, but not limited to, a microcode, a device drive, a redundancy processing unit, an external disk drive array, a RAID system, a tape drive, a data backup storage system, and the like.

The processing unit 16 executes various function applications and data processing by running programs stored in the system memory 28, for example, to implement the steps of the service request processing method provided in any of the embodiments of the present disclosure. The method includes that: a target domain name resolution request corresponding to a target federated service to be accessed by a first deployment unit in a current working cluster is generated; the target domain name resolution request is sent to a federated domain name cluster, so that based on a federated gateway address and a federated endpoint set that correspond to each federated service determined by the federated management cluster, the federated domain name cluster possesses the target domain name resolution request to determine and return a target internet protocol (IP) address corresponding to the target federated service, where the federated gateway address is a cluster IP address allocated to a federated service, and the federated endpoint set includes deployment unit IP addresses for implementing a federated service in each working cluster; an IP address of a second deployment unit for implementing the target federated service in a target working cluster is determined based on the target IP address and based on the federated gateway address and the federated endpoint set that correspond to each federated service determined by the federated management cluster; and the target federated service request is sent to the second deployment unit based on the IP address of the second deployment unit so that the second deployment unit responds to the target federated service request.

Of course, it is to be understood by those skilled in the art that the processor may also implement the technical solution of the service request processing method provided in any of the embodiments of the present disclosure.

This embodiment provides a computer-readable storage medium storing a computer program. The program, when executed by a processor, implements the steps of the service request processing method provided in any of the embodiments of the present disclosure.

The computer storage medium of the embodiments of the present disclosure may adopt any combination of one or more computer-readable media. The computer-readable medium may be a computer-readable signal medium or a computer-readable storage medium. The computer-readable storage medium may be, for example, but not limited to, an electronic, magnetic, optical, electromagnetic, infrared, or semiconductor system, apparatus, or device, or any combination of the foregoing. More specific examples (a non-exhaustive list) of the computer-readable storage medium include: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In this context, the computer-readable storage medium may be any tangible medium that contains or stores a program for use by or in connection with an instruction execution system, apparatus, or device.

The computer-readable signal medium may include a propagated data signal with a computer-readable program code carried therein, for example, in a baseband or as part of a carrier wave. Such a propagated data signal may adopt a variety of forms, including, but not limited to, an electromagnetic signal, an optical signal, or any suitable combination of the foregoing. The computer-readable signal medium may be any computer-readable medium that is not the computer-readable storage medium and that may transmit, propagate, or transport the program for use by or in connection with an instruction execution system, apparatus, or device.

Program codes embodied on the computer-readable medium may be transmitted using any appropriate medium, including but not limited to, wireless, wire, optic cable, RF, etc., or any suitable combination of the foregoing.

A computer program code for performing the operations of the present disclosure may be written in one or more programming languages or combinations thereof, the described programming languages include an object-oriented programming language-such as Java, Smalltalk, C++, and further include a conventional procedural programming language-such as a "C" language or similar programming language. The program code may be executed in following manners: executed entirely on a user's computer, executed partly on the user's computer, executed as an independent software package, executed partly on the user's computer and partly on a remote computer, or executed entirely on the remote computer or a server. In a case where the remote computer is involved, the remote computer may be connected to the user's computer through any kind of network, including a local area network (LAN) or a wide area network (WAN), or may be connected to an external computer (for example, connected to the external computer through an internet provided by an internet service provider).

It should be understood by those skilled in the art that each of the modules or steps of the present disclosure described above may be implemented by a general-purpose computing device, the modules or steps may be concentrated on a single computing device or distributed on a network composed of multiple computing devices, and alternatively, the modules or steps may be implemented by program codes executable by the computing devices, so that the modules or steps may be stored in the storage device and executed by the computing device, or the modules or steps may be made into various integrated circuit modules separately, or multiple modules or steps therein may be made into a single integrated circuit module for implementation. In this way, the present disclosure is not limited to any specific combination of hardware and software.

What is claimed is:

1. A service request processing method, applied to each working cluster managed by a federated management cluster, comprising:

generating a target domain name resolution request corresponding to a target federated service to be accessed by a first deployment unit in a current working cluster;

sending the target domain name resolution request to a federated domain name cluster, so that based on a federated gateway address and a federated endpoint set that correspond to each federated service determined by the federated management cluster, the federated domain name cluster processes the target domain name resolution request to determine and return a target internet protocol (IP) address corresponding to the target federated service, wherein the federated gateway address is a cluster IP address allocated to a federated service, and the federated endpoint set comprises deployment unit IP addresses for implementing a federated service in each working cluster;

based on the target IP address and based on the federated gateway address and the federated endpoint set that correspond to each federated service determined by the federated management cluster, determining an IP address of a second deployment unit for implementing the target federated service in a target working cluster; and based on the IP address of the second deployment unit, sending the target federated service request to the second deployment unit so that the second deployment unit responds to the target federated service request.

2. The service request processing method of claim 1, wherein generating the target domain name resolution request corresponding to the target federated service to be accessed by the first deployment unit in the current working cluster comprises:

generating a current domain name resolution request corresponding to a service to be accessed by the first deployment unit in the current working cluster; and in response to detecting that service identification information corresponding to the service to be accessed is target federated service identification information, determining that the current domain name resolution request is the target domain name resolution request corresponding to the target federated service.

3. The service request processing method of claim 1, wherein based on the federated gateway address and the federated endpoint set that correspond to each federated service determined by the federated management cluster, processing the target domain name resolution request to determine and return the target IP address corresponding to the target federated service comprises:

resolving the target domain name resolution request to obtain a target service type corresponding to the target federated service; and based on the target service type and based on the federated gateway address and the federated endpoint set that correspond to each federated service determined by the federated management cluster, performing a domain name resolution to determine a target IP address corresponding to a resolved target federated service.

4. The service request processing method of claim 3, wherein based on the target service type and based on the federated gateway address and the federated endpoint set that correspond to each federated service determined by the federated management cluster, performing the domain name resolution to determine the target IP address corresponding to the resolved target federated service comprises:

in a case where the target service type is a ClusterIP service type, determining a target federated gateway address corresponding to the target federated service based on the federated gateway address corresponding to each federated service determined by the federated management cluster, and determining a target cluster IP address corresponding to the target federated gateway address as the target IP address; and in a case where the target service type is a Headless service type, determining a target federated endpoint set corresponding to the target federated service based on the federated endpoint set corresponding to each federated service determined by the federated management cluster, and determining all the deployment unit IP addresses in the target federated endpoint set as target IP addresses.

5. The service request processing method of claim 1, wherein based on the target IP address and based on the federated gateway address and the federated endpoint set that correspond to each federated service determined by the federated management cluster, determining the IP address of the second deployment unit for implementing the target federated service in the target working cluster comprises:

in a case where a target IP address is detected to be a target cluster IP address based on the federated gateway address corresponding to each federated service determined by the federated management cluster, performing load balancing based on the target cluster IP address and based on the federated endpoint set corresponding to each federated service determined by the federated management cluster, and determining the IP address of the second deployment unit for implementing the target federated service in the target working cluster; and in a case where target IP addresses are detected to be a plurality of deployment unit IP addresses, determining, from the plurality of deployment unit IP addresses, the IP address of the second deployment unit for implementing the target federated service in the target working cluster.

6. The service request processing method of claim 1, wherein a process of determining the federated gateway address and the federated endpoint set that correspond to each federated service comprises:

acquiring, by the federated management cluster, a current deployment object and a current service object that correspond to a to-be-created current federated service;

sending the current deployment object to a deployment working cluster based on deployment working cluster information in the current deployment object to create a corresponding deployment unit so that a created deployment unit implements the current federated service;

allocating an IP address to the current service object, determining a current cluster IP address corresponding to the current service object, and adding the current cluster IP address, federated service identification information and a deployment unit selector to the current service object;

sending an added current service object to each working cluster so that each working cluster determines a current endpoint set corresponding to the current federated service in each working cluster based on a received current service object, wherein the current endpoint set comprises a current deployment unit IP address for implementing the current federated service; and generating a current federated endpoint set corresponding to the current federated service based on the current endpoint set sent by each working cluster, and converting the current service object into a federated gateway, to obtain a current federated gateway address corresponding to the current federated service.

7. The service request processing method of claim 2, wherein a process of determining the federated gateway address and the federated endpoint set that correspond to each federated service comprises:

acquiring, by the federated management cluster, a current deployment object and a current service object that correspond to a to-be-created current federated service;

sending the current deployment object to a deployment working cluster based on deployment working cluster information in the current deployment object to create a corresponding deployment unit so that a created deployment unit implements the current federated service;

allocating an IP address to the current service object, determining a current cluster IP address corresponding to the current service object, and adding the current cluster IP address, federated service identification information and a deployment unit selector to the current service object;

sending an added current service object to each working cluster so that each working cluster determines a current endpoint set corresponding to the current federated service in each working cluster based on a received current service object, wherein the current endpoint set comprises a current deployment unit IP address for implementing the current federated service; and generating a current federated endpoint set corresponding to the current federated service based on the current endpoint set sent by each working cluster, and converting the current service object into a federated gateway, to obtain a current federated gateway address corresponding to the current federated service.

8. The service request processing method of claim 3, wherein a process of determining the federated gateway address and the federated endpoint set that correspond to each federated service comprises:

acquiring, by the federated management cluster, a current deployment object and a current service object that correspond to a to-be-created current federated service;

sending the current deployment object to a deployment working cluster based on deployment working cluster information in the current deployment object to create a corresponding deployment unit so that a created deployment unit implements the current federated service;

allocating an IP address to the current service object, determining a current cluster IP address corresponding to the current service object, and adding the current cluster IP address, federated service identification information and a deployment unit selector to the current service object;

sending an added current service object to each working cluster so that each working cluster determines a current endpoint set corresponding to the current federated service in each working cluster based on a received current service object, wherein the current endpoint set comprises a current deployment unit IP address for implementing the current federated service; and generating a current federated endpoint set corresponding to the current federated service based on the current endpoint set sent by each working cluster, and converting the current service object into a federated gateway, to obtain a current federated gateway address corresponding to the current federated service.

9. The service request processing method of claim 4, wherein a process of determining the federated gateway address and the federated endpoint set that correspond to each federated service comprises:

acquiring, by the federated management cluster, a current deployment object and a current service object that correspond to a to-be-created current federated service;

sending the current deployment object to a deployment working cluster based on deployment working cluster information in the current deployment object to create a corresponding deployment unit so that a created deployment unit implements the current federated service;

allocating an IP address to the current service object, determining a current cluster IP address corresponding to the current service object, and adding the current cluster IP address, federated service identification information and a deployment unit selector to the current service object;

sending an added current service object to each working cluster so that each working cluster determines a current endpoint set corresponding to the current federated service in each working cluster based on a received current service object, wherein the current endpoint set comprises a current deployment unit IP address for implementing the current federated service; and generating a current federated endpoint set corresponding to the current federated service based on the current endpoint set sent by each working cluster, and converting the current service object into a federated gateway, to obtain a current federated gateway address corresponding to the current federated service.

10. The service request processing method of claim 5, wherein a process of determining the federated gateway address and the federated endpoint set that correspond to each federated service comprises:

acquiring, by the federated management cluster, a current deployment object and a current service object that correspond to a to-be-created current federated service;

sending the current deployment object to a deployment working cluster based on deployment working cluster information in the current deployment object to create a corresponding deployment unit so that a created deployment unit implements the current federated service;

allocating an IP address to the current service object, determining a current cluster IP address corresponding to the current service object, and adding the current cluster IP address, federated service identification information and a deployment unit selector to the current service object;

sending an added current service object to each working cluster so that each working cluster determines a current endpoint set corresponding to the current federated service in each working cluster based on a received current service object, wherein the current endpoint set comprises a current deployment unit IP address for implementing the current federated service; and generating a current federated endpoint set corresponding to the current federated service based on the current endpoint set sent by each working cluster, and converting the current service object into a federated gateway, to obtain a current federated gateway address corresponding to the current federated service.

11. The service request processing method of claim 6, wherein determining, by each working cluster, the current endpoint set corresponding to the current federated service in each working cluster based on the received current service object comprises:

determining, by each working cluster, a current deployment unit for implementing the current federated service, from the created deployment unit and based on the deployment unit selector in the received current service object; and based on the current deployment unit IP address, determining the current endpoint set corresponding to the current federated service in each working cluster.

12. An electronic device, comprising:

one or more processors; and a memory configured to store one or more programs;

wherein the one or more programs, when executed by the one or more processors, cause the one or more processors to implement a service request processing method;

wherein the service request processing method comprises:

generating a target domain name resolution request corresponding to a target federated service to be accessed by a first deployment unit in a current working cluster;

sending the target domain name resolution request to a federated domain name cluster, so that based on a federated gateway address and a federated endpoint set that correspond to each federated service determined by the federated management cluster, the federated domain name cluster processes the target domain name resolution request to determine and return a target internet protocol (IP) address corresponding to the target federated service, wherein the federated gateway address is a cluster IP address allocated to a federated service, and the federated endpoint set comprises deployment unit IP addresses for implementing a federated service in each working cluster;

based on the target IP address and based on the federated gateway address and the federated endpoint set that correspond to each federated service determined by the federated management cluster, determining an IP address of a second deployment unit for implementing the target federated service in a target working cluster; and based on the IP address of the second deployment unit, sending the target federated service request to the second deployment unit so that the second deployment unit responds to the target federated service request.

13. The electronic device of claim 12, wherein generating the target domain name resolution request corresponding to the target federated service to be accessed by the first deployment unit in the current working cluster comprises:

generating a current domain name resolution request corresponding to a service to be accessed by the first deployment unit in the current working cluster; and in response to detecting that service identification information corresponding to the service to be accessed is target federated service identification information, determining that the current domain name resolution request is the target domain name resolution request corresponding to the target federated service.

14. The electronic device of claim 12, wherein based on the federated gateway address and the federated endpoint set that correspond to each federated service determined by the federated management cluster, processing the target domain name resolution request to determine and return the target IP address corresponding to the target federated service comprises:

resolving the target domain name resolution request to obtain a target service type corresponding to the target federated service; and based on the target service type and based on the federated gateway address and the federated endpoint set that correspond to each federated service determined by the federated management cluster, performing a domain name resolution to determine a target IP address corresponding to a resolved target federated service.

15. The electronic device of claim 14, wherein based on the target service type and based on the federated gateway address and the federated endpoint set that correspond to each federated service determined by the federated management cluster, performing the domain name resolution to determine the target IP address corresponding to the resolved target federated service comprises:

in a case where the target service type is a ClusterIP service type, determining a target federated gateway address corresponding to the target federated service based on the federated gateway address corresponding to each federated service determined by the federated management cluster, and determining a target cluster IP address corresponding to the target federated gateway address as the target IP address; and in a case where the target service type is a Headless service type, determining a target federated endpoint set corresponding to the target federated service based on the federated endpoint set corresponding to each federated service determined by the federated management cluster, and determining all the deployment unit IP addresses in the target federated endpoint set as target IP addresses.

16. The electronic device of claim 12, wherein based on the target IP address and based on the federated gateway address and the federated endpoint set that correspond to each federated service determined by the federated management cluster, determining the IP address of the second deployment unit for implementing the target federated service in the target working cluster comprises:

in a case where a target IP address is detected to be a target cluster IP address based on the federated gateway address corresponding to each federated service determined by the federated management cluster, performing load balancing based on the target cluster IP address and based on the federated endpoint set corresponding to each federated service determined by the federated management cluster, and determining the IP address of the second deployment unit for implementing the target federated service in the target working cluster; and in a case where target IP addresses are detected to be a plurality of deployment unit IP addresses, determining, from the plurality of deployment unit IP addresses, the IP address of the second deployment unit for implementing the target federated service in the target working cluster.

17. A non-transitory computer-readable storage medium, storing a computer program, wherein the program, when executed by a processor, implements a service request processing method; wherein the service request processing method comprises:

generating a target domain name resolution request corresponding to a target federated service to be accessed by a first deployment unit in a current working cluster;

sending the target domain name resolution request to a federated domain name cluster, so that based on a federated gateway address and a federated endpoint set that correspond to each federated service determined by the federated management cluster, the federated domain name cluster processes the target domain name resolution request to determine and return a target internet protocol (IP) address corresponding to the target federated service, wherein the federated gateway address is a cluster IP address allocated to a federated service, and the federated endpoint set comprises deployment unit IP addresses for implementing a federated service in each working cluster;

based on the target IP address and based on the federated gateway address and the federated endpoint set that correspond to each federated service determined by the federated management cluster, determining an IP address of a second deployment unit for implementing the target federated service in a target working cluster; and based on the IP address of the second deployment unit, sending the target federated service request to the second deployment unit so that the second deployment unit responds to the target federated service request.

18. The non-transitory computer-readable storage medium of claim 17, wherein generating the target domain name resolution request corresponding to the target federated service to be accessed by the first deployment unit in the current working cluster comprises:

generating a current domain name resolution request corresponding to a service to be accessed by the first deployment unit in the current working cluster; and in response to detecting that service identification information corresponding to the service to be accessed is target federated service identification information, determining that the current domain name resolution request is the target domain name resolution request corresponding to the target federated service.

19. The non-transitory computer-readable storage medium of claim 17, wherein based on the federated gateway address and the federated endpoint set that correspond to each federated service determined by the federated management cluster, processing the target domain name resolution request to determine and return the target IP address corresponding to the target federated service comprises:

resolving the target domain name resolution request to obtain a target service type corresponding to the target federated service; and based on the target service type and based on the federated gateway address and the federated endpoint set that correspond to each federated service determined by the federated management cluster, performing a domain name resolution to determine a target IP address corresponding to a resolved target federated service.

20. The non-transitory computer-readable storage medium of claim 19, wherein based on the target service type and based on the federated gateway address and the federated endpoint set that correspond to each federated service determined by the federated management cluster, performing the domain name resolution to determine the target IP address corresponding to the resolved target federated service comprises:

in a case where the target service type is a ClusterIP service type, determining a target federated gateway address corresponding to the target federated service based on the federated gateway address corresponding to each federated service determined by the federated management cluster, and determining a target cluster IP address corresponding to the target federated gateway address as the target IP address; and in a case where the target service type is a Headless service type, determining a target federated endpoint set corresponding to the target federated service based on the federated endpoint set corresponding to each federated service determined by the federated management cluster, and determining all the deployment unit IP addresses in the target federated endpoint set as target IP addresses.

* * * * *